United States Patent
Inai et al.

(10) Patent No.: US 8,216,731 B2
(45) Date of Patent: Jul. 10, 2012

(54) FUEL CELL SYSTEM AND FUEL CONTROL METHOD

(75) Inventors: Shigeru Inai, Saitama (JP); Hiromichi Yoshida, Saitama (JP); Ryo Jinba, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 1027 days.

(21) Appl. No.: 11/702,088

(22) Filed: Feb. 5, 2007

(65) Prior Publication Data

US 2007/0184313 A1   Aug. 9, 2007

(30) Foreign Application Priority Data

Feb. 9, 2006   (JP) ................................. 2006-033076

(51) Int. Cl.
*H01M 8/04*   (2006.01)

(52) U.S. Cl. ........ 429/429; 429/428; 429/430; 429/431; 429/437; 429/442; 429/443

(58) Field of Classification Search .................... 429/13, 429/22, 23, 428, 443, 444, 450, 429, 430, 429/431, 433, 442
See application file for complete search history.

(56) References Cited

U.S. PATENT DOCUMENTS

| | | | | |
|---|---|---|---|---|
| 2002/0146610 | A1* | 10/2002 | Hayashi et al. | 429/30 |
| 2003/0039870 | A1* | 2/2003 | Busenbender | 429/13 |
| 2005/0053809 | A1* | 3/2005 | Hayashi et al. | 429/13 |

FOREIGN PATENT DOCUMENTS

| | | | |
|---|---|---|---|
| JP | 2002-305014 A | | 10/2002 |
| JP | 2005-116257 A | | 4/2005 |
| JP | 2005-259664 A | | 9/2005 |
| JP | 2006-100094 | * | 4/2006 |

OTHER PUBLICATIONS

Japanese Office Action from JP App. No. 2006-033076 dated on Nov. 29, 2011.

* cited by examiner

*Primary Examiner* — Jennifer Michener
*Assistant Examiner* — Heng Chan
(74) *Attorney, Agent, or Firm* — Arent Fox LLP

(57) ABSTRACT

A fuel cell system includes a fuel cell and a supplying unit, which supplies reactive gases to the fuel cell. A control unit includes a power production effective area calculator calculates the areas of the electrodes available for power production as a power production effective area. A current density calculator which calculates a current density of the power production effective area calculated by the power production effective area calculator based on the total amount of power required by the fuel cell. A gas supply amount determiner determines the amount of reactive gas to be supplied to the fuel cell depending on the current density. A gas supply controller controls the supplying unit so as to supply the amount of reactive gas determined by the gas supply amount determiner to the fuel cell.

2 Claims, 4 Drawing Sheets

FUEL CELL SYSTEM AND FUEL CONTROL METHOD

CROSS-REFERENCE TO RELATED APPLICATION

This application is based on and claims the benefit of priority from Japanese Patent Application No. 2006-033076, the content of which is incorporated in its entirety herein by reference.

BACKGROUND OF THE INVENTION

1. Field of the Invention

The present invention relates to a vehicle-installed fuel cell system and a fuel cell control method.

2. Description of Related Art

Recently, fuel cell systems have drawn attention as new sources of power that can be used to drive vehicles. For example, a fuel cell system can be configured with a fuel cell which produces electric power from chemical reactions of reactive gases, wherein a reactive gas supplying unit supplies reactive gases to the fuel cell via a reactive gas channel, and a control unit controls the reactive gas supplying unit.

In another example, a fuel cell can be structured to include a plurality, e.g., tens or hundreds, of stacked cells. In such an example, each cell is configured with a membrane electrode assembly (MEA) sandwiched between a pair of separators. The MEA is configured with two electrodes, that is an anode (i.e., a positive electrode) and a cathode (i.e., a negative electrode), and a solid polymer electrolyte membrane sandwiched between the two electrodes.

Supply of hydrogen gas and oxygenated air as reactive gases to the anode and cathode of the fuel cell, respectively, causes an electrochemical reaction from which the fuel cell produces electric power. Since only water, which is essentially harmless to the environment, is generated during power production, the fuel cell has garnered attention from the viewpoint of environmental impact, and availability of the technology.

When the aforementioned fuel cell system is activated at a low temperature, a phenomenon wherein the generated water condenses within the fuel cell (flooding) may occur.

To solve the aforementioned problem, a method of supplying oxidized gas to the fuel cell at an excessively higher flow rate than the standard rate until the fuel cell warms up by self-heating when the system is activated at a low temperature has been proposed in Japanese Unexamined Patent Application Publication No. 2005-116257 (hereafter referred to as JP '257).

The fuel cell system disclosed in JP '257 discharges the majority of generated water from the fuel cell by supplying an excessive amount of oxidized gas, which prevents any flooding of the fuel cell, and facilitates stable activation of the system at a low temperature.

Although antifreeze, which does not freeze at 0° C., is contained in pores within the MEA, the antifreeze may freeze in a cryogenic environment, such as at approximately 40° C. below freezing. In such a case, pores between a reactive gas supply channel and the inside of the MEA are closed due to ice. As a result, the supply of reactive gases cannot reach a reactive area (i.e., catalyst surface) within the MEA.

Frozen antifreeze behaves the same as regular ice. Accordingly, the frozen antifreeze should be melted by warming up the interior of the MEA until the temperature within the MEA exceeds 0° C. in order to reopen the gas supply channel to the reactive area.

However, even if the fuel cell system of JP '257 is intended to be activated below freezing (below 0° C.), when the fuel cell is exposed to a cryogenic environment and the antifreeze within the MEA freezes, an area within the MEA where ice is formed is not able to produce power. As a result, there is a decrease in total areas within the MEA that is available to produce power.

As mentioned above, the current density in the areas within the MEA that are available to produce power increases locally because the fuel cell produces enough electric power for the required output voltage even though the antifreeze within the MEA has frozen. As a result, a partial current density of the MEA becomes excessively high, resulting in the accelerated deterioration of the MEA in that area.

SUMMARY OF THE INVENTION

An aspect of the present invention is to provide a fuel cell system and a fuel cell control method which limit an extent of deterioration of the fuel cell even if a part of a membrane component of the fuel cell is unavailable to produce power.

According to the first aspect of the present invention, the fuel cell system includes a fuel cell including a membrane, and an anode and a cathode which sandwich the membrane therebetween. The fuel cell produces electric power from a reaction of reactive gases with the membrane when the reactive gases are supplied to the anode and the cathode, respectively. A supplying means supplies reactive gases to the fuel cell. A controlling means controls the supplying means. The controlling means is configured with a power production effective area estimating means which estimates areas of the electrodes that are available to be a power production effective area. A current density calculating means calculates a current density of the power production effective area calculated by the power production effective area estimating means based on the total power required for the fuel cell. A gas supply amount determining means determines the amount of reactive gas to be supplied to the fuel cell based on the current density. A gas supply controlling means controls the supplying means so as to supply the amount of reactive gas determined by the gas supply amount determining means to the fuel cell.

It is within the scope of the present invention for the membrane to be a solid polymer membrane. Furthermore, the reactive gases may be hydrogen gas and oxygenated air.

According to the first aspect of the present invention, the fuel cell system includes the power production effective area estimating means, the current density calculating means, the gas supply amount determining means, and the gas supply controlling means. The above listed features allows for estimating the power production effective areas of the electrodes configuring the fuel cell, calculating the current density of the calculated power production effective area, determining the amount of reactive gas to be supplied based on the current density, and controlling the amount of reactive gas supplied to the fuel cell based on the determination.

As a result, an increase in the current density of the residual parts of the electrodes is prevented by controlling the supplied amount of reactive gas even if a part of the electrodes is unavailable for power production, while also suppressing deterioration of the membrane, thereby preventing deterioration of the fuel cell.

In addition, in the areas of the electrodes unavailable for power production, materials contained in the catalyst may be consumed due to a lack of reactive gas supply, possibly deteriorating the catalyst.

However, according to the present invention, supplying the reactive gases only to the areas of the electrodes available for power production in the cryogenic environment prevents materials contained in the catalyst from being consumed, which allows for power to be produced in a subfreezing environment while the fuel cell is protected.

DETAILED DESCRIPTION OF THE PREFERRED EMBODIMENT(S)

Figure 1:
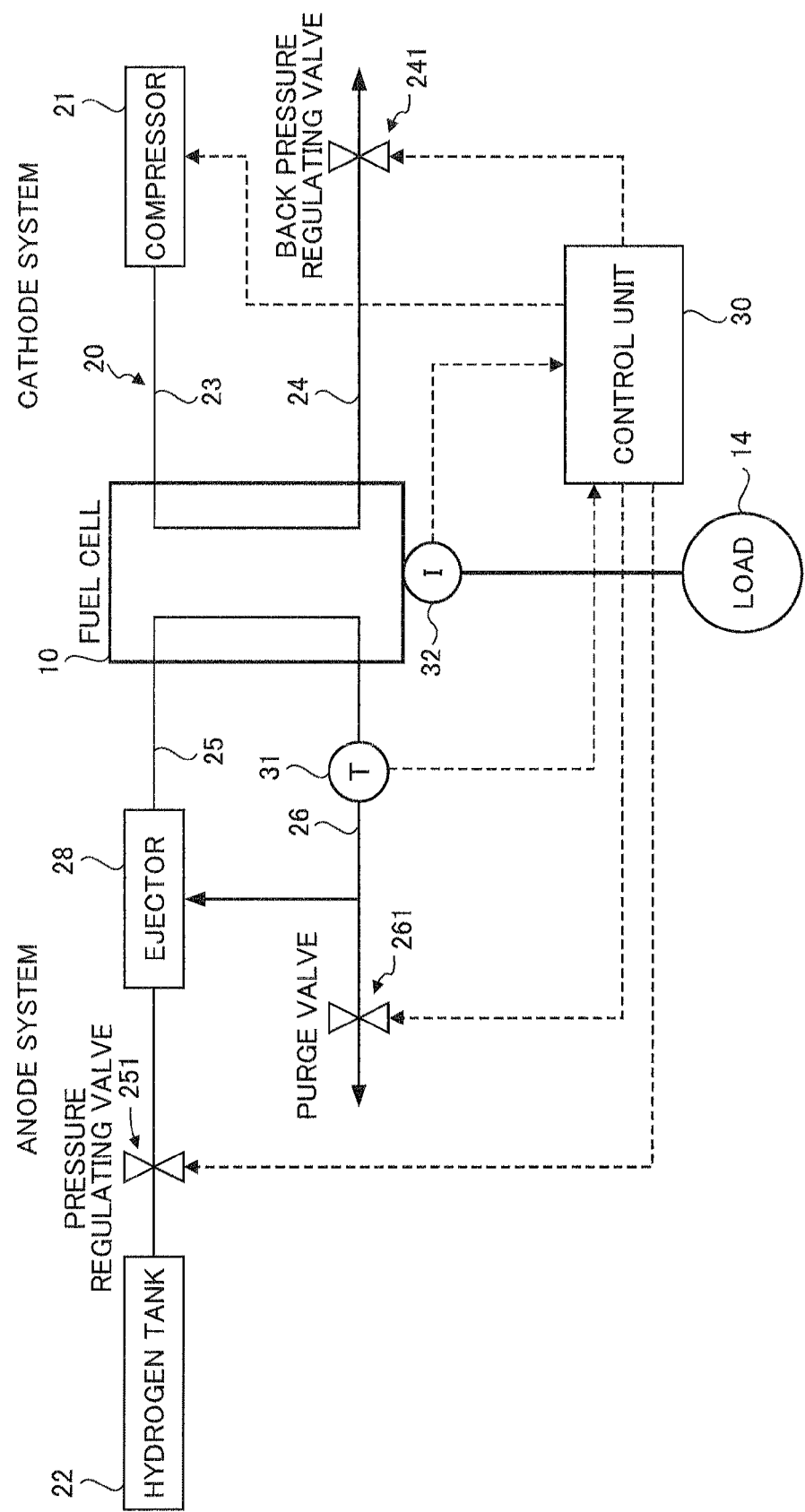
FIG. 1 is a schematic diagram of a fuel cell system according to an embodiment of the present invention.

FIG. 1 is a schematic diagram of a fuel cell system 1 according to an embodiment of the present invention.

The fuel cell system 1 includes a fuel cell 10, a supplying unit 20 that corresponds to a reactive gas supplying means, which supplies reactive gases (e.g., hydrogen gas and air) to the fuel cell 10, and a control unit 30 or controlling means, which controls the supplying unit 20.

Figure 2:
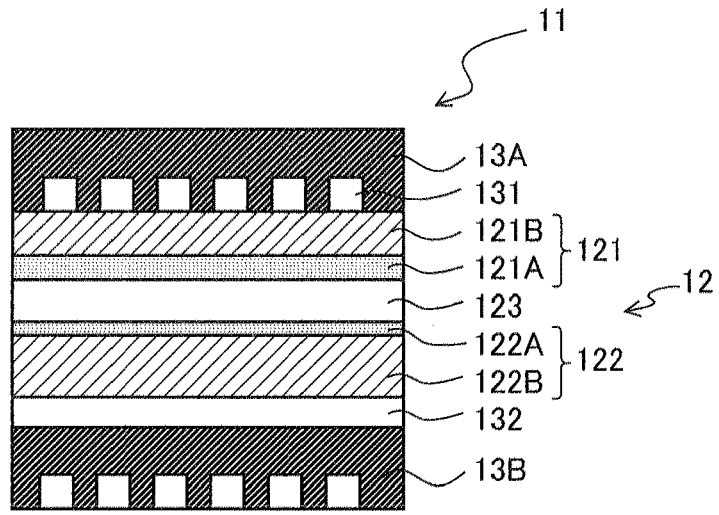
FIG. 2 is a cross-sectional view of a cell that makes up part of a fuel cell.

FIG. 2 is a cross-sectional view of a cell 11 that makes up part of the fuel cell 10.

In other words, the fuel cell 10 has a stacked structure of, for example, a plurality of, e.g., tens or hundreds, of stacked cells 11. Each cell 11 includes a membrane electrode assembly (MEA) 12 sandwiched between a pair of separators 13A and 13B. Each MEA 12 includes a solid polymer membrane 123, and an anode (i.e., positive electrode) 121 and a cathode (i.e., negative electrode) 122 between which the solid polymer membrane 123 is disposed.

The electrodes 121 and 122 include catalyst layers 121A and 122A, respectively, which contact the solid polymer membrane 123 and cause an oxidation reduction reaction, and gas diffused layers 121B and 122B, respectively, which contact the catalyst layers 121A and 122A, respectively.

A hydrogen circulating groove 131 is formed on the separator 13A, which is joined to the diffused layer 121B. An air circulating groove 132 is formed between the diffused layer 122B and the separator 13B.

Returning to FIG. 1, a supply of reactive gases, e.g., hydrogen gas and air, to the anode (positive electrode) and cathode (negative electrode), respectively, causes an electrochemical reaction from which the fuel cell 10 produces electric power.

In addition, a load 14 is connected to the fuel cell 10, and a current sensor 32 is provided therebetween.

The supplying unit 20 includes a compressor 21, which supplies air to the cathode side of the fuel cell 10, a hydrogen tank 22, which supplies hydrogen gas to the anode side, and an ejector 28.

The compressor 21 is connected to the cathode side of the fuel cell 10 via an air supply channel 23. An air discharge channel 24 is connected to the cathode side of the fuel cell 10. A back pressure regulating valve 241 is provided at the end of the air discharge channel 24.

The hydrogen tank 22 is connected to the anode side of the fuel cell 10 via a hydrogen supply channel 25 along which the ejector 28 is provided. A pressure regulating valve 251 is provided along the hydrogen supply channel 25 between the hydrogen tank 22 and the ejector 28.

A hydrogen discharge channel 26 is connected to the anode side of the fuel cell 10, while a purge valve 261 is provided at the end of the hydrogen discharge channel 26. A temperature sensor 31 is provided along the hydrogen discharge channel 26 near the fuel cell 10. The hydrogen discharge channel 26, which is closer to the anode side than the purge valve 261, is branched and connected to the ejector 28.

The ejector 28 collects hydrogen gas, which flows through the hydrogen discharge channel 26 via the branch channel thereof, and directs the hydrogen gas to flow back to the hydrogen supply channel 25.

The compressor 21, the back pressure regulating valve 241, the purge valve 261, and the pressure regulating valve 251 are controlled by the control unit 30, which will be described later. Furthermore, the temperature sensor 31 and the current sensor 32 are connected to the control unit 30.

The procedure to produce electric power using the fuel cell 10 is described below.

Hydrogen gas is supplied from the hydrogen tank 22 to the anode side of the fuel cell 10 via the hydrogen supply channel 25 while the purge valve 261 is closed. In addition, air is supplied from the compressor 21 to the cathode side of the fuel cell 10 via the air supply channel 23.

The hydrogen gas and air supplied to the fuel cell 10 are used for producing power and then flow into the hydrogen discharge channel 26 and air discharge channel 24, respectively, along with any residual water that is generated on the anode side. At this time, since the purge valve 261 is closed, the hydrogen gas flowing through the hydrogen discharge channel 26 flows back to the ejector 28 and is ready to be reused.

Afterwards, the hydrogen gas, air, and any residual water are discharged from the hydrogen discharge channel 26 and the air discharge channel 24 by opening the purge valve 261 and the back pressure regulating valve 241 an appropriate amount.

Figure 3:
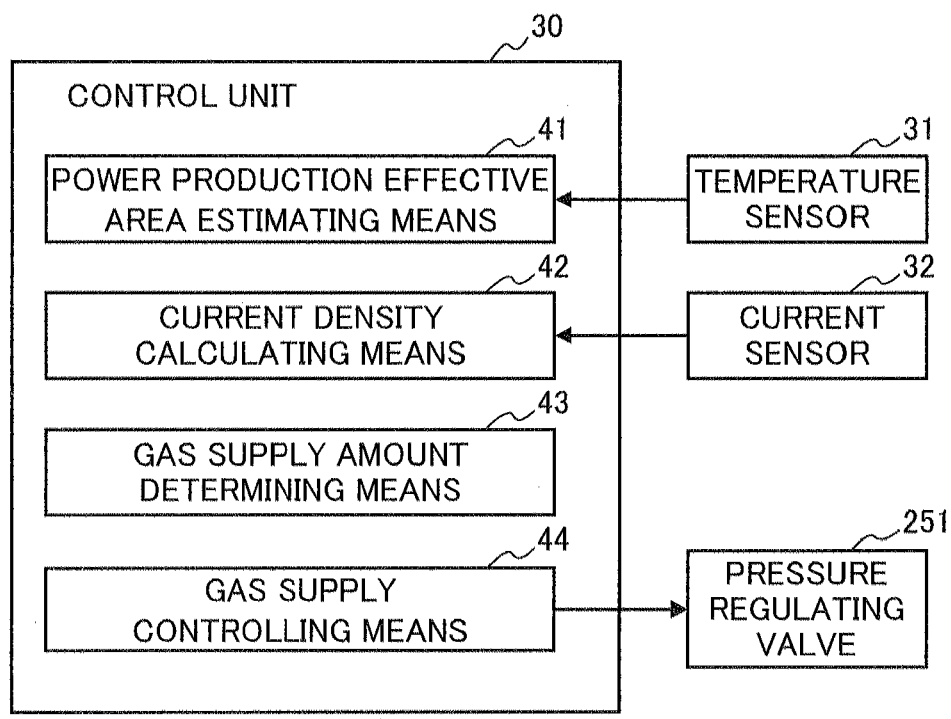
FIG. 3 is a block diagram of a control unit used by the fuel cell system.

FIG. 3 is shows a block diagram of the control unit 30.

The control unit 30 includes a power production effective area estimating means 41, a current density calculating means 42, a gas supply amount determining means 43, and a gas supply controlling means 44.

The temperature sensor 31 measures the temperature of the hydrogen gas flowing through the hydrogen discharge channel 26, and transmits the result to the control unit 30 as the temperature within the fuel cell 10. The temperature sensor 31 continuously measures the temperature not only when the fuel cell 10 produces electric power, but also when the fuel cell 10 is stopped (i.e., soaked).

The current sensor 32 measures the power producing current value of the fuel cell 10, and transmits the result to the control unit 30 as the output current required by the load 14.

An ignition switch (not shown) is connected to the control unit 30. The ignition switch is provided on the driver's seat of a fuel-cell vehicle, and transmits on/off signals to the control unit 30 based on how the switch is manipulated by the driver. The control unit 30 produces electric power from the fuel cell 10 based on whether the ignition switch is turned on or off.

The power production effective area estimating means 41 calculates areas of the electrodes 121 and 122 that are effective for producing power after the fuel cell 10 has been activated.

Figure 4:
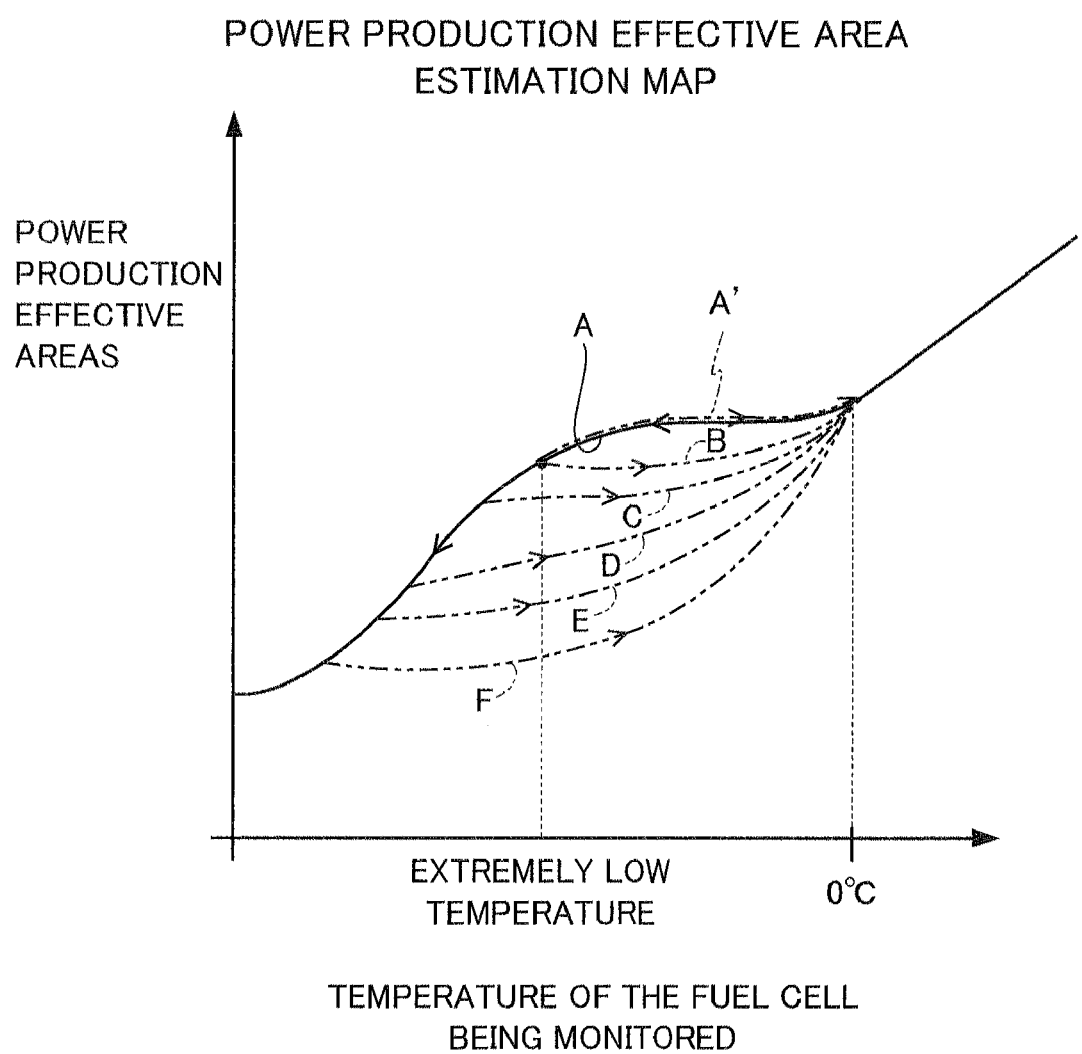
FIG. 4 is a graph illustrating a relationship between power production effective areas of electrodes and a lowest temperature of a monitored fuel cell.

FIG. 4 is a graph (i.e., a power production effective area estimation map) showing the relationship between the lowest temperature of the fuel cell being monitored and the power production effective areas of the electrodes 121 and 122.

As mentioned above, antifreeze contained in the MEA freezes in a cryogenic environment. When the antifreeze turns into ice, the behavior of the ice made from the antifreeze is the same as that of regular ice. Accordingly, the frozen antifreeze does not melt completely until the temperature within the MEA exceeds 0° C.

More specifically, as illustrated in FIG. 4, the temperature of the fuel cell 10 decreases when the fuel cell 10 is stopped, for example, when the power production effective areas of the electrodes 121 and 122 decrease along a route A. If the temperature of the fuel cell 10 then increases when the fuel cell 10 is activated, the power production effective areas of the electrodes 121 and 122 increase along routes A', B, C, D, E, and F.

In this case, the when temperature of the fuel cell 10 increases without having reached an extremely low temperature, the antifreeze is not frozen, resulting in an increase in the power production effective area along the route A'. In other words, the power production effective area varies along the same route regardless of whether temperature of the fuel cell 10 decreases or increases.

On the other hand, when the temperature of the fuel cell 10 reaches the predetermined, i.e., an extremely low, temperature, and then increases, the antifreeze freezes, resulting in an increase in the power production effective area along routes B through F. In other words, the power production effective area varies along different routes depending on whether the temperature of the fuel cell 10 decreases or increases (hysteresis characteristic).

As mentioned above, the power production effective area estimating means 41 stores the lowest temperature of the fuel cell 10 measured by the temperature sensor 31, and determines whether the lowest temperature of the fuel cell 10 is less than a predetermined, and possibly an extremely low, temperature. That is, the power production effective area estimating means 41 determining whether the temperature is below a temperature which allows a determination that antifreeze within the electrodes 121 and 122 is frozen. When the lowest temperature of the fuel cell 10 is determined as less than the predetermined, i.e., extremely low, temperature, the power production effective areas of the anode 121 and the cathode 122 are estimated based on the power production effective area estimation map of FIG. 4. In this above embodiment, while the power production effective areas of the anode 21 and cathode 122 are estimated based on the power production effective area estimation map, the power production effective areas are calculated by predetermined numerical formula.

The current density calculating means 42 calculates the current density based on the power production effective area calculated by the power production effective area estimating means 41 and outputs the current required by the load 14 measured by the current sensor 32. More specifically, the current density calculating means 42 calculates the current density of the electrodes 121 and 122 by dividing the current value measured by the current sensor 32 by the power production effective area.

The gas supply amount determining means 43 determines the amount of reactive gas to be supplied to the fuel cell 10 based on the current density calculated by the current density calculating means 42.

The gas supply controlling means 44 controls the pressure regulating valve 251 to supply the amount of reactive gas determined by the gas supply amount determining means 43 to the fuel cell 10.

Figure 5:
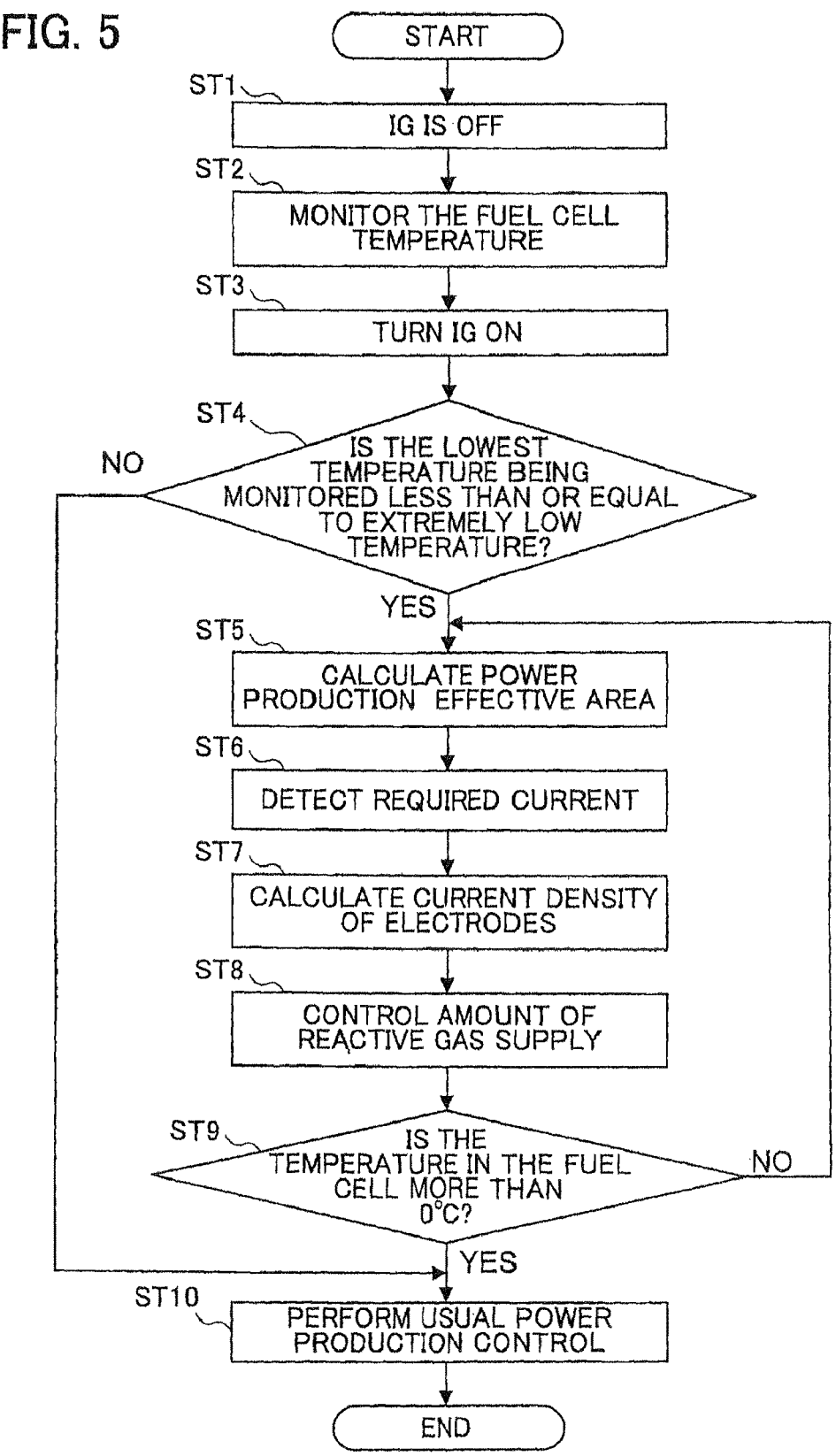
FIG. 5 is a flowchart of the fuel cell system.

The operation of the aforementioned fuel cell system 1 is now described while referencing the flowchart of FIG. 5.

The first step is to turn the ignition switch (IG) off (ST1). The temperature of the fuel cell 10 is then measured by the temperature sensor 31, and the lowest temperature of the fuel cell 10 is stored in the power production effective area estimating means 41, that is, the temperature of the fuel cell 10 is monitored (ST2).

Then, when the ignition switch (IG) is turned on (ST3), the power production effective area estimating means 41 determines whether the stored lowest temperature of the fuel cell 10 is less than the predetermined, i.e., extremely low, temperature (ST4). If the answer is negative, i.e., No, the process proceeds to ST10, which is described below.

On the other hand, if the answer is positive, i.e., YES, the power production effective area estimating means 41 calculates the power production effective areas of the electrodes 121 and 122 (ST5). The current density calculating means 42 then detects the output current required by the load 14 using the current sensor 32 (ST6), and then calculates the current density of the electrodes 121 and 122 (ST7). Next, the gas supply amount determining means 43 determines the amount of reactive gas supply, and the gas supply controlling means 44 controls the amount of reactive gas to be supplied to the fuel cell 10 (ST8).

It is then determined whether the temperature within the fuel cell 10 measured by the temperature sensor 31 exceeds 0° C. (ST9). If the answer is negative, i.e., NO, the frozen antifreeze has not completely melted. Accordingly, the method returns to ST5, and control of the amount of reactive gas supplied to the fuel cell 10 is continued. On the other hand, if the answer is positive, i.e., YES, the frozen antifreeze is considered to have nearly completely melted. Accordingly, usual power production control is performed (ST10).

The above described embodiment of the present invention has several advantages.

For example, the fuel cell system 1 includes the power production effective area estimating means 41, the current density calculating means, the gas supply amount determining means 43, and the gas supply controlling means 44.

The structural arrangement of these components allows calculation of the power production effective area of the anode 121 and the cathode 122, calculation of the current density of the calculated power production effective area, determination of the amount of reactive gas supply based on the current density, and control of the amount of reactive gas supply for the fuel cell 10 according to the determination.

As such, any increase in the current density of the remaining parts of the electrodes 121 and 122 is prevented by controlling the supplied amount of reactive gas, even if a part of the anode 121 and the cathode 122 is unavailable for power production, and suppresses the deterioration of the electrodes 121 and 122, thereby preventing deterioration of the fuel cell 10.

In addition, supplying the reactive gas only to the areas of the electrodes 121 and 122 available for power production in a cryogenic environment prevents materials contained in the catalyst layers 121A and 122A from being consumed, which allows for the production of power in a subfreezing environment while protecting the fuel cell 10.

Also, When the lowest temperature of the fuel cell 10 is less than a predetermined, i.e., the extremely low, temperature, the power production effective area estimating means 41 calculates the power production effective areas of the electrodes 121 and 122 based on the temperature of the fuel cell 10. This allows for the effective calculation of the power production area by detecting the melting state of the frozen antifreeze based on the temperature of the fuel cell 10, even if the fuel cell 10 is activated below freezing.

Although, the temperature within the fuel cell 10 is measured by the temperature sensor 31, the temperature within the fuel cell 10 may also be directly measured by a sensor in or near the fuel cell 10, itself.

While a preferred embodiment of the present invention has been described and illustrated above, it is to be understood that it is an exemplary embodiment of the present invention and is not to be considered to be limiting. Additions, omissions, substitutions, and other modifications can be made thereto without departing from the spirit and/or scope of the present invention. Accordingly, the invention is not to be considered to be limited by the foregoing description and/or the appended claims.

What is claimed is:

1. A control method for a fuel cell, which comprises a membrane, and a positive electrode and a negative electrode which sandwich the membrane therebetween, wherein the fuel cell produces electric power from a reaction of reactive gases via the membrane when the reactive gases are supplied to the positive and negative electrodes, the method comprising the following steps of:

monitoring a temperature of the fuel cell when the fuel cell is in a state in which electricity is not being generated;

estimating areas of the positive and negative electrodes available for producing power, each area of each positive electrode and each area of each negative electrode for which an estimation is performed defining a power production effective area;

calculating a current density of the estimated power production effective areas based on a current required by a load connected to the fuel cell;

determining an amount of reactive gases to be supplied to the fuel cell based on the calculated current density; and supplying the determined amount of reactive gases to the fuel cell, wherein the power production effective areas of the positive and negative electrodes are estimated using a power production effective area estimation map in which the temperature of the monitored fuel cell and the power production effective areas are associated with each other, the power production effective areas being estimated based on the temperature of the monitored fuel cell associated therewith in the power production effective area estimation map, and the power production effective area estimation map has a hysteresis characteristic in which a relationship between the power production effective areas and the temperature of the monitored fuel cell during a rise in the temperature of the monitored fuel cell differs from a relationship between the power production effective areas and the temperature of the monitored fuel cell during a decline in the temperature of the monitored fuel cell when a lowest temperature of the monitored fuel cell is lower than a freezing temperature of an antifreeze within the monitored fuel cell.

2. The control method for a fuel cell of claim 1, wherein in the power production effective area estimation map, a relationship between the power production effective area and the temperature of the monitored fuel cell during the rise in the temperature of the monitored fuel cell is the same as the relationship between the power productive effective areas and the temperature of the monitored fuel cell during the decline in temperature of the monitored fuel cell when the lowest temperature of the monitored fuel cell is higher than the freezing temperature of the antifreeze within the monitored fuel cell.

* * * * *

UNITED STATES PATENT AND TRADEMARK OFFICE
CERTIFICATE OF CORRECTION

PATENT NO. : 8,216,731 B2  Page 1 of 1
APPLICATION NO. : 11/702088
DATED : July 10, 2012
INVENTOR(S) : Shigeru Inai et al.

It is certified that error appears in the above-identified patent and that said Letters Patent is hereby corrected as shown below:

Title Page-

Item (54), and in Column 1, line 1 please change the title FUEL CELL SYSTEM AND FUEL CONTROL METHOD to read -- FUEL CELL SYSTEM AND FUEL CELL CONTROL METHOD --.

Signed and Sealed this
Eighteenth Day of December, 2012

David J. Kappos
*Director of the United States Patent and Trademark Office*